United States Patent [19]
Oda et al.

[11] Patent Number: 5,781,282
[45] Date of Patent: Jul. 14, 1998

[54] DISTANCE MEASUREMENT DEVICE

[75] Inventors: Hajime Oda; Masuo Ogihara, both of Yotsukaido, Japan

[73] Assignee: SEIKO Precision Inc., Japan

[21] Appl. No.: 537,537

[22] Filed: Oct. 2, 1995

[30]   Foreign Application Priority Data

Oct. 3, 1994   [JP]   Japan .................................. 6-238895

[51] Int. Cl.⁶ ............................. G01C 3/08; G01S 13/58
[52] U.S. Cl. ..................... 356/5.03; 342/105; 342/110
[58] Field of Search ........................... 342/105, 110; 356/5.03

[56]   References Cited

U.S. PATENT DOCUMENTS

| | | | |
|---|---|---|---|
| 4,527,894 | 7/1985 | Goede et al. | 356/28 |
| 5,049,887 | 9/1991 | Henning et al. | 342/110 |

FOREIGN PATENT DOCUMENTS

| | | |
|---|---|---|
| 588687 | 3/1994 | European Pat. Off. . |
| 1208615 | 10/1970 | United Kingdom . |
| 1367600 | 9/1974 | United Kingdom . |
| 2226467 | 6/1990 | United Kingdom . |

*Primary Examiner*—Mark Hellner
*Attorney, Agent, or Firm*—Adams & Wilks

[57]   ABSTRACT

A distance measurement device is provided which determines the measurement zone of an object and also determines the direction of movement of the object within the measurement zone. The distance measurement device comprises distance measurement means for measurement a distance to an object, judging means for judging which measurement zone from a plurality of measurement zones divided within the full distance measurement range of the distance measurement means that the object belongs to, storing means for storing the distance measurement result, movement detection means for comparing a current distance measurement result with a preceding distance measurement result stored in the storing means, determining whether the object has moved away from, toward, or remained stationary with respect to the distance measurement means in accordance with the comparison result, and output means for generating a first output signal in accordance with a judgement result of the judging means and a second output signal in accordance with a determination of the movement detection means.

13 Claims, 4 Drawing Sheets

FIG. 3

| distance measuring result | | output level | | | |
|---|---|---|---|---|---|
| region | direction | Dd | Dc | Db | Da |
| Z1 | N | L | L | L | L |
| | S | L | L | L | H |
| | F | L | L | H | L |
| Z2 | N | L | L | H | H |
| | S | L | H | L | L |
| | F | L | H | L | H |
| Z3 | N | L | H | H | L |
| | S | L | H | H | H |
| | F | H | L | L | L |

5,781,282

DISTANCE MEASUREMENT DEVICE

FIELD OF THE INVENTION

The present invention generally relates to a distance measurement device for measurement a distance to an object. More specifically, the present invention relates to a distance measurement device capable of determining a measurement zone to which an object belongs, and of detecting a direction of movement of the object based on a distance measurement result when the full distance measurement range of the distance measurement apparatus is divided into a plurality of measurement zones.

BACKGROUND INFORMATION

Applicants have proposed a distance measurement device which is capable of determining which measurement zone a measurement result obtained by the apparatus belongs to from a plurality of measurement zones within the full measurement range of the device. In one such distance measurement device disclosed in Japanese Patent Application No. 6-213883, the full distance measurement range of the distance measurement device is divided into a plurality of measurement zones. It is then determined which measurement zone the object under measurement belongs to based on the distance measurement result, and the result of this determination is output or displayed.

As explained above, applicants' earlie stance measurement device merely indicates the measurement zone in which the object under measurement is located, and makes no judgement as to whether the object under measurement is being moved toward the near side or the far side of the measurement zone. In order to make any judgement as to the direction of movement of the object, it is necessary to wait until the object under measurement enters into another measurement zone. Accordingly, the conventional distance measurement device is applied only to a limited field of utilization.

SUMMARY OF THE INVENTION

In view of the foregoing, one object of the present invention is to provide a distance measurement device capable of determining a measurement zone in which an object under measurement is present. It is another object of the present invention to provide a distance measurement device capable of determining whether an object under measurement is moving toward a near side of the measurement zone, a far side of the measurement zone, or is otherwise stationary.

To achieve the above-described objects and others, a distance measurement device is provided in accordance with one aspect of the present invention which comprises distance measurement means for measuring a distance to an object under measurement, division point setting means for dividing the full distance measurement range of the distance measurement means into a plurality of predetermined measurement zones, judging means for judging which measurement zone a distance measurement result obtained by the distance measurement means belongs to, memory means for storing the distance measurement result, and movement detection means for detecting a direction of movement of the object.

Preferably, the movement detection means includes means for comparing a current distance measurement result with a preceding distance measurement result stored in the memory means and detects whether the object has moved further or closer to the distance measurement means or has remained in a stationary position with respect to the distance measurement means.

More preferably, the distance measurement device is provided with output means for generating a first output signal in accordance with an output of the judging means and a second output in accordance with an output of the movement detection means, such that the measurement zone and direction of movement of the object under measurement can be displayed.

In order to accurately detect movement of the object under measurement, the movement detection means preferably determines that the object is moving when the current distance measurement result differs more than a predetermined amount from the preceding distance measurement result.

The distance measurement device preferably includes direction storage means for storing movement detection results on a historical basis, and the movement detection means includes means for detecting movement of the object only when investigating a predetermined number of movement detection results stored in the movement direction storage means are either the same, or represent the same trend.

BRIEF DESCRIPTION OF THE DRAWINGS

FIG. 3 is a table representing a combination of output levels derived from the distance measurement device of FIG. 1.

DETAILED DESCRIPTION OF THE PREFERRED EMBODIMENTS

A distance measurement device according to a first embodiment of the present invention will now be described in detail.

Figure 1:
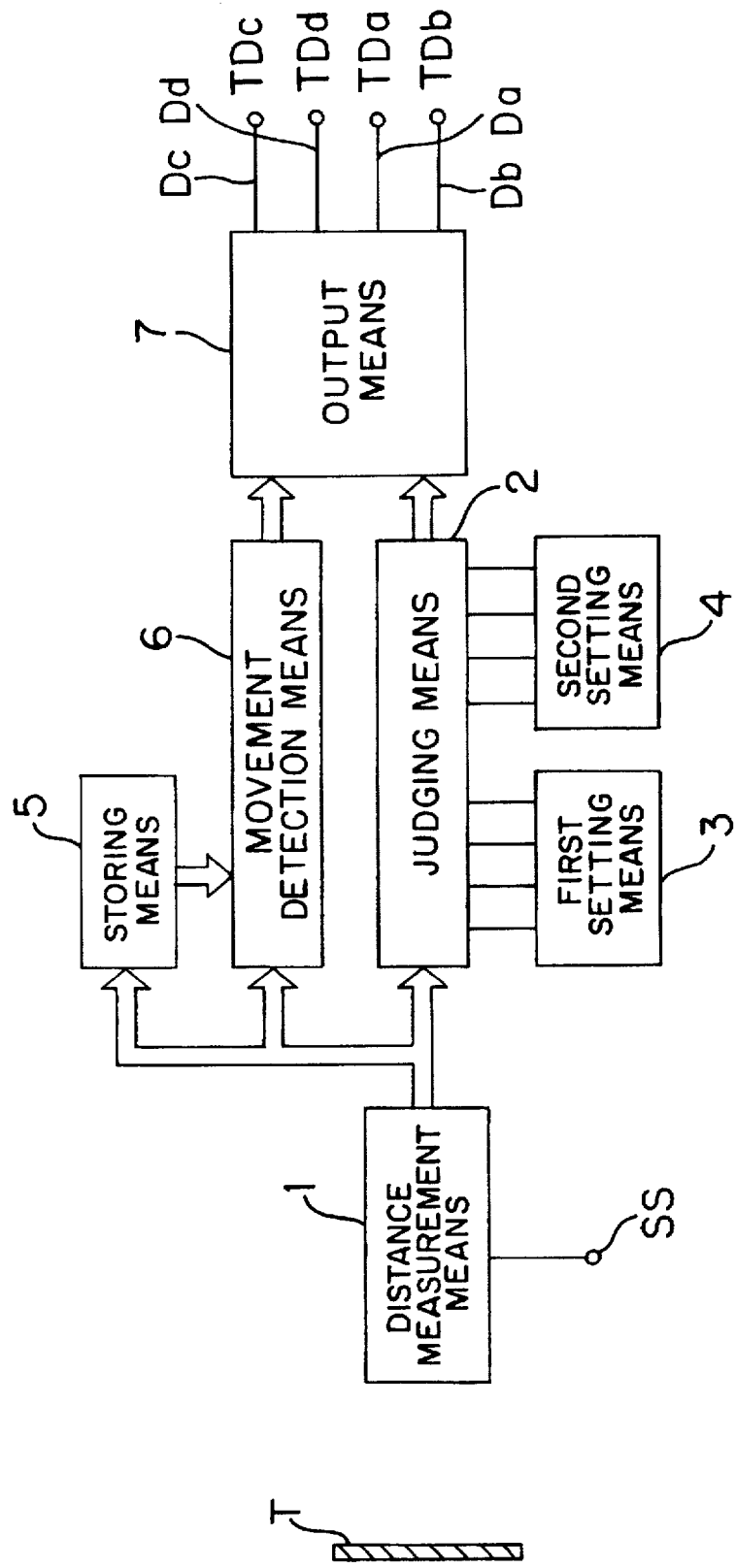
FIG. 1 is a circuit block diagram of a distance measurement device according to a first embodiment of the present invention.

FIG. 1 is a circuit block diagram representing an arrangement of a distance measurement device in accordance with a first embodiment of the present invention. For ease of discussion, in the following description the full measurable range of a distance measurement means is divided into three measurement zones by two specific distance points (hereinafter referred to as "division points").

In FIG. 1, reference numeral 1 represents a distance measurement means for measurement of the distance to an object "T" and for converting the measurement result into a digital signal. The distance measurement means 1 may comprise means for emitting infrared light and for detecting the infrared light reflected from the object "T" using a position sensing device (PSD). Alternatively, the distance measurement means 1 may comprise means for measurement of a distance from the object "T" utilizing ultrasonic waves. Reference numeral 3 denotes first setting means for setting a first division point Pa, and reference numeral 4 denotes second setting means for setting a second division point Pb. In FIG. 1, the first and second setting means 3 and 4 comprise digital switches having 4-bit output lines. In this case, any of 16 different division points Pa and Pb may be set by each of the 4-bit digital switches.

Figure 2:
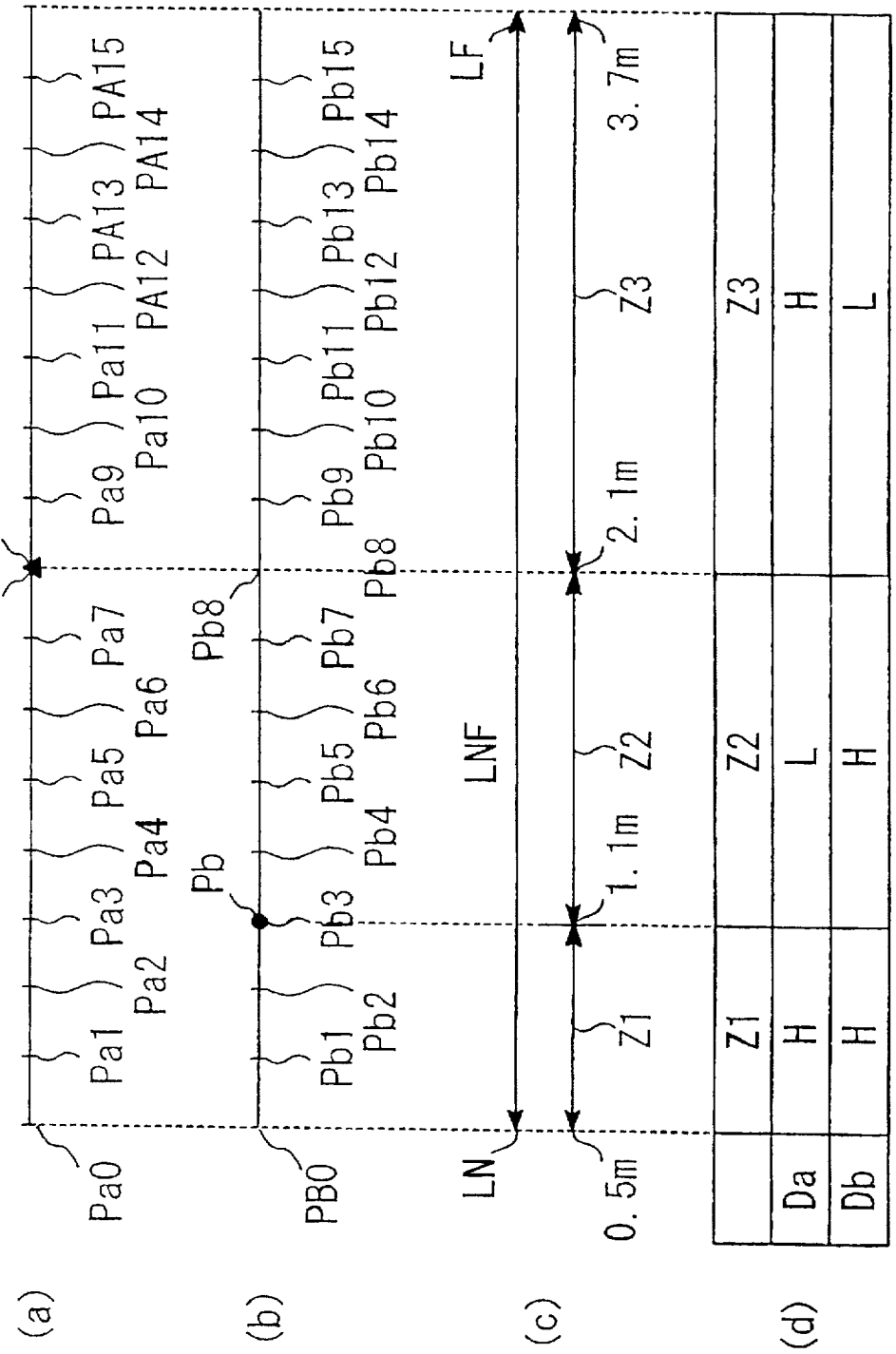
FIG. 2 is a diagram used for explaining the use of measurement zones in the distance measurement device of FIG. 1.

The relationship between division points and measurement zones will now be explained with reference to FIG. 2. In FIG. 2, the abscissa represents the distance measured from the distance measurement means 1, in which the farthest measurable point is defined as "LF" (for example, 3.7 m) and the closest measurable point is defined as "LN" (for example, 0.5 m). As illustrated in FIGS. 2(a) and 2(b), the distance measurement area (LNF) is equally divided into 16 distance measurement regions by the 16 different division points capable of being set by the first and second setting means 3, 4. As shown in FIG. 2(a), the division point Pa may be any one of distance points Pan (wherein "n" is a natural number from 0 to 15). In FIG. 2(a), there is shown the case in which the division point Pa is set to Pa8 (n=8), where the distance from the distance measurement means 1 is 2.1 m (0.5 m+8×0.2 m).

Similarly, as illustrated in FIG. 2(b), the second division point Pb may be set to any one of distance points Pbm (wherein "lm" is a natural number from 0 to 15). In FIG. 2(b), there is shown the case in which the second division point Pb is set to Pb3 (m=3), where the distance from the distance measurement means 1 is 1.1 m (0.5 m+3×0.2 m). In other words, it is shown that the first division point Pa is set to a distance of 2.1 m by the first setting means 3, whereas the second division point Pb is set to a distance of 1.1 m by the second setting means 4. The first and second division points Pa and Pb together define three distance measurement zones Z1, Z2 and Z3 within the full measurement range (LNF) of the distance measurement means 1.

Referring back to FIG. 1, a terminal SS provided on the distance measurement means 1 is an input terminal for inputting a trigger signal by which a distance measurement operation is commenced. Reference numeral 2 represents judging means for judging which measurement zone distance measurement result obtained by the distance measurement means 1 is located from the three distance measurement zones Z1, Z2, Z3 (FIG. 2c) produced by dividing the full distance measurable range by the first division point Pa and the second division point Pb, and for providing the judgement result to an output means 7. The output means 7 includes output terminals TDa and TDb, on which two output signals Da and Db are generated, with levels as indicated in the table of FIG. 2d, based upon the judgement result of the judging means 2. Assuming that a high level is indicated as "H" and a low level is indicated as "L", the levels of the outputs corresponding to measurement zone Z1 at the near side, defined by the first division point Pa, are as follows: Da="H" and Db="H". The levels of the outputs of the central measurement zone Z2 divided by the first and second division points Pa and Pb are Da="L" and Db="H". Further, the levels of the outputs corresponding to measurement zone Z3 at the far side, and defined by the second division point Pb, are expressed by Da="H" and Db="L". When the distance measurement result obtained by the distance measurement means 1 is, for instance, 1.5 m, the measurement zone is Z2, and the output levels are expressed by Da="L" and Db="H".

As will be appreciated, alternatively, outputs representative of the three measurement zones Z1, Z2, Z3 may be allocated to three output terminals corresponding to the respective measurement zones. In this case, the output level on the output terminal corresponding to a respective measurement zone in which the object "T" under measurement is located will be different from the output levels on the other output terminals.

Reference numeral 5 denotes storing means for storing a distance measurement result obtained by the distance measurement means 1, into which the distance measurement is continuously stored and updated. Reference numeral 6 denotes a movement detection means. This movement detection means 6 detects movement of the object T by comparing an updated distance measurement result (hereinafter referred to as "a present distance measurement result") obtained by the distance measurement means 1 with a preceding distance measurement result stored in the storing means 5, and also determines whether the present distance measurement result indicates that the object has moved closer to the device, farther from the device, or has remained stationary with respect to the device by comparing the present distance measurement result with the preceding distance measurement result.

The output means 7 converts the output of the movement detection means 6 to output levels Dc and Dd on a pair of output terminals TDc and TDd, respectively. For example, if the present distance measurement result is equal to the previous distance measurement result, then the output levels at the output terminals of the output means 7 are expressed by Dc="L" and Dd="L". When the present distance measurement result indicates that the object T has moved closer to the device with respect to the previous distance measurement result, the output levels of the output terminals are Dc="H" and Dd="L". When the present distance measurement result indicates that the object T has moved farther away from the device with respect to the previous distance measurement result, the output levels of the output signals are Dc="L" and Dd="H".

Although the output terminals TDa and TDb which are used to output signals indicative of the measurement zone are separate from the terminals TDc and TDd employed to output the signals representative of the direction of movement of the object T in the above-described embodiment, both of these information signals may instead be mixed with each other.

In the table of FIG. 3, there is illustrated one example of possible combinations of these output signals. FIG. 3 illustrates an example in which four outputs (Da, Db, Dc, Dd) are employed to represent that the number of measurement zones is 3 (Z1, Z2, Z3), and the number of directions is 3 (namely, "N" indicates movement away from the device, "F" denotes movement toward the device, and "S" represents a stationary condition). As explained above, since the number of measurement zones is selected to be 3 and the number of movement directions is also selected to be 3, the outputs must be capable of representing 9 possible conditions. Thus, four distinct output terminals are required.

Assuming now that no indication of a stationary state "S" is required when the object is in measurement zone Z3, then only outputs capable of representing 8 conditions are required. As a result, only three output terminals (i e., Da, Db, Dc of FIG. 3) are sufficient, so that the total number of output terminals may be reduced.

Generally, even when the distance between the distance measurement means 1 and the object T is constant, an error component may exist in a distance measurement result. Also, even when it may be observed that an object, such as a living body, remains stationary, the object may nonetheless be pivoted. In such cases, movement detection means 6 may generate different results each time the distance is measured, resulting in unstable measurement values. To avoid this problem, two preceding distance measurement results may be stored in the storing means 5, and the movement detection means 6 may compare the present distance measurement result with the two previous distance measurement results. As a result, more accurate distance judgement can be achieved in comparison with that of the above-described embodiment, in which only the immediately preceding measurement result is compared with the present measurement. For instance, when the present distance measurement result is the same as the immediately preceding distance measurement result but is farther than that of the next preceding distance measurement result, the movement direction judging means 6 may determine that the direction of movement is further away from the device. When the present distance measurement result is the same as the second preceding distance measurement result but is closer (or farther) than that of the immediately preceding distance measurement result, the movement detection means 6 may determine the direction of movement as "stationary".

Problems may be encountered, however, when the movement detection means 6 is set to recognize movement only when the difference between the present distance measurement result and the immediately preceding distance measurement result stored in the storing means 5 is larger than a predetermined value. For example, in the case that the object T under measurement is being slowly moved, changes in the distance values for each of the distance measurement operations may be less than the predetermined distance. In this event, the movement detection means 6 will erroneously detect this condition as "stationary", depending upon the value of the predetermined distance. A description will now be made of an embodiment capable of solving this problem.

Figure 4:
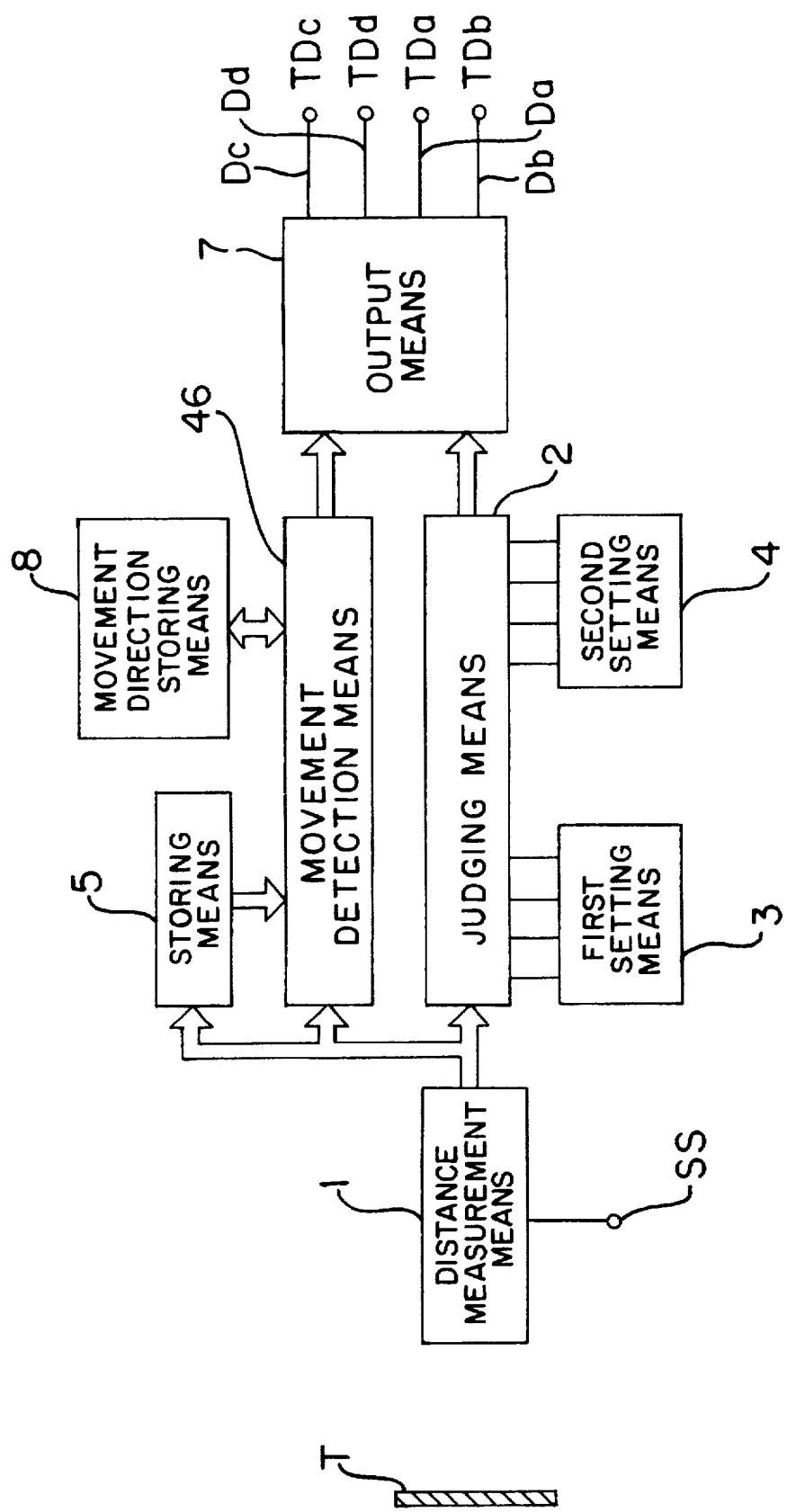
FIG. 4 is a circuit block diagram of a distance measurement device according to a second embodiment of the present invention.

In FIG. 4, there is shown a circuit block diagram of a distance measurement device in accordance with a second embodiment of the present invention, in which the same reference numerals shown in FIG. 1 are employed for denoting the same circuit elements. In FIG. 4, reference numeral 8 is a movement direction storing means for storing and updating a predetermined number of current movement detection results which are judged by a movement detection means 46.

The movement detection means 46 compares the present distance measurement result obtained by the distance measurement means 1 with the previous distance measurement result stored in the storing means 5, thereby determining the direction of change of the present distance measurement result with respect to the previous distance measurement result, or determining whether or not the present distance measurement result has changed with respect to the previous distance measurement result. Moreover, the movement detection means 46 performs a historical investigation by comparing the direction of movement of the object for a predetermined number of preceding measurement operations, such as by analyzing the immediately preceding movement direction and the next preceding movement direction, which data has been stored in the movement direction storing means 8. The movement detection means 46 determines movement based upon whether or not the detected movement direction is the same or has the same trend as the historical data stored in the moving direction storing means 8.

For example, assuming that the most recent 8 distance measurement results are as follows: Movement of the object toward the device is detected 4 times, movement of the object away from the device is detected 1 time, and a stationary condition is detected 3 times. In this case, it is possible to judge by the majority of the test results that the object T is being moved toward the distance measurement means 1 based on the fact that the distance measurement results indicated such movement 5 times over the preceding in 8 measurement operations. Thus, it is determined that the object T is undergoing overall movement toward the distance measurement means 1.

As described in detail above, in the distance measurement device of the present invention, it is possible to determine not only in which measurement zone within a plurality of divided measurement zones an object under measurement is located, but it is also possible to detect direction of movement of the object under measurement within the relevant measurement zone.

We claim:

1. A distance measurement device comprising: distance measurement means for measuring a distance to an object; setting means for dividing the full distance measurement range of the distance measurement means into a plurality of measurement zones of predetermined distance; judging means for judging which of the plurality of measurement zones a distance measurement result of the distance measurement means belongs to; storing means for storing a distance measurement result; movement detection means for comparing a current distance measurement result with a preceding distance measurement result stored in the storing means and determining, in accordance with the comparison, whether the object has moved further away from, closer to, or has remained in a stationary position with respect to the distance measurement means; and output means for generating a first output signal in accordance with a judgment result of the judging means and a second output signal in accordance with a comparison result of the movement detection means; wherein the movement detection means includes means for determining movement of the object only when a difference between the current distance measurement result and the preceding distance measurement result is greater than a predetermined value.

2. A distance measurement device comprising: distance measurement means for measuring a distance to an object; setting means for dividing the full distance measurement range of the distance measurement means into a plurality of measurement zones of predetermined distance; judging means for judging which of the plurality of measurement zones a distance measurement result of the distance measurement means belongs to; storing means for storing a distance measurement result; movement detection means for comparing a current distance measurement result with a previous distance measurement result stored in the storing means, determining whether the object has moved farther from, closer to, or has remained in a stationary position with respect to the distance measurement means, and producing a corresponding movement direction signal; and movement direction data storage means for storing a plurality of successive movement direction data; wherein the movement detection means includes means for detecting movement of the object in accordance with a plurality of the movement direction data stored in the movement direction storing means.

3. A distance measurement device according to claim 2; further comprising output means for generating a first output signal in accordance with a judgment result of the judging means and a second output signal in accordance with a comparison result of the movement detection means.

4. A distance measurement device according to claim 1; wherein the distance measurement means comprises means for projecting an infrared light onto the object and a position sensitive device for detecting infrared light reflected by the. object.

5. A distance measurement device according to claim 1; wherein the setting means comprises first setting means for dividing the measurement range of the distance measurement means into a plurality of first measurement zones by using at least one of a plurality of first division points which divide the measurement range by first intervals, and second setting means for dividing at least one of the plurality of first measurement zones into a plurality of second measurement zones by using at least one of a plurality of second division points which divide the measurement range by second intervals.

6. A distance measurement device according to claim 5; wherein the first and second setting means each comprises a digital switch.

7. A distance measurement device according to claim 2; wherein the distance measurement means comprises means for projecting an infrared light onto the object and a position sensitive device for detecting infrared light reflected by the object.

8. A distance measurement device according to claim 2; wherein the setting means comprises first setting means for dividing the measurement range of the distance measurement means into a plurality of first measurement zones by using at least one of a plurality of first division points which divide the measurement range by first intervals, and second setting means for dividing at least one of the plurality of first measurement zones into a plurality of second measurement zones by using at least one of a plurality of second division points which divide the measurement range by second intervals.

9. A distance measurement device according to claim 8; wherein the first and second setting means each comprises a digital switch.

10. A distance measurement device comprising: distance measurement means for measuring a distance to an object; setting means for dividing a measurement range of the distance measurement means into a plurality of measurement zones; judging means for judging which respective measurement zone the object is located in; movement detection means for detecting movement of the object within the respective measurement zone; and output means for outputting a signal in accordance with an output of the judging means representative of the respective measurement zone the object is located in and for outputting another signal representative of relative movement of the object within the respective measurement zone; wherein the output means includes a plurality of output terminals for outputting a predetermined unique combination of output levels for each of the respective measurement zones and another predetermined unique combination of output levels other than that corresponding to the respective measurement zones to identify each of a plurality of possible relative movement directions of the object.

11. A distance measurement device according to claim 10; wherein the distance measurement means comprises means for projecting an infrared light onto the object and a position sensitive device for detecting infrared light reflected by the object.

12. A distance measurement device according to claim 10; wherein the setting means comprises first setting means for dividing the measurement range of the distance measurement means into a plurality of first measurement zones by using at least one of a plurality of first division points which divide the measurement range by first intervals, and second setting means for dividing at least one of the plurality of first measurement zones into a plurality of second measurement zones by using at least one of a plurality of second division points which divide the measurement range by second intervals.

13. A distance measurement device according to claim 12; wherein the first and second setting means each comprises a digital switch.

* * * * *